US007110720B1

(12) United States Patent
Henderson

(10) Patent No.: US 7,110,720 B1
(45) Date of Patent: Sep. 19, 2006

(54) LOCAL AREA INTERNET RADIO RECEIVER/TRANSMITTER

(75) Inventor: P. Michael Henderson, Tustin, CA (US)

(73) Assignee: Skyworks Solutions, INC, Irvine, CA (US)

( * ) Notice: Subject to any disclaimer, the term of this patent is extended or adjusted under 35 U.S.C. 154(b) by 0 days.

(21) Appl. No.: 09/407,149

(22) Filed: Sep. 28, 1999

(51) Int. Cl.
*H04H 1/00* (2006.01)

(52) U.S. Cl. .................... 455/66.1; 455/42; 455/3.04; 455/3.05; 455/39; 455/228; 370/352

(58) Field of Classification Search ............... 455/66, 455/9, 42, 39, 228, 3.03–3.06, 66.1; 370/352
See application file for complete search history.

(56) References Cited

U.S. PATENT DOCUMENTS

| 5,737,692 | A | * | 4/1998 | Lang .................... 455/66.1 |
| 5,867,223 | A | * | 2/1999 | Schindler et al. ........... 348/552 |
| 5,915,207 | A | * | 6/1999 | Dao et al. .................... 455/9 |
| 6,298,218 | B1 | * | 10/2001 | Lowe et al. ................. 455/66 |
| 6,314,094 | B1 | * | 11/2001 | Boys ..................... 370/352 |
| 6,389,463 | B1 | * | 5/2002 | Bolas et al. ............... 709/219 |

FOREIGN PATENT DOCUMENTS

WO    WO 99/38266    *    7/1999

* cited by examiner

*Primary Examiner*—Edan Orgad
(74) *Attorney, Agent, or Firm*—Thomas, Kayden, Horstemeyer, & Risley, LLP

(57) ABSTRACT

In accordance with the invention, radio program content or other audio communications and music are transmitted as digital information through the Internet to an Internet radio receiver/transmitter device. The device converts received digital information to analog information and broadcasts the information in the radio frequency band at low power in a localized area for reception by ordinary FM or AM radios. The device is capable of receiving multiple streams of different digital information, and broadcasting each of these on separate radio frequencies, so that each person in a household may hear its own selected programming on its own preselected radio frequency. It is programmable as to at least broadcast commence time, frequency and end time, if desired. Moreover, it may store received information to play at a preprogrammed time, or on demand.

17 Claims, 2 Drawing Sheets

LOCAL AREA INTERNET RADIO RECEIVER/TRANSMITTER

BACKGROUND OF THE INVENTION

1. Field of Invention

The invention pertains to the receiving of transmissions through the Internet and selective broadcasting of these transmissions in the radio frequency wave band at low power to local area receivers.

2. Description of the Related Art

In the field of communication, there is a long standing need to communicate information to particular targeted audiences that have an interest (or potential interest) in the subject matter of the communication. This is important from a commercial standpoint because advertisers are more likely to promote their products and services through a medium that has a high likelihood of reaching their target market. Further, a communications medium that reaches an audience interested in the particular information being communicated is also of interest, regardless of commercial opportunities presented, for purposes of cooperation and exchange of information between persons with common purpose or interest. However, sometimes the target market or audience, although large in aggregate, is thinly spread across the United States, or the world. For example, communications relating to fly fishing may have a relatively large aggregate audience, but the audience may be thinly scattered throughout the United States and elsewhere, in small communities or even as individuals. While such an audience could conceivably be reached in the United States through a nationally distributed magazine, audio communications, or broadcast from a radio station, the communications would have to be broadcast nationwide to reach all interested persons. Providing such specialized national radio broadcasts directed to potential listeners scattered in small groups throughout the country (or world) may not be economically viable, even though the potential listeners may in aggregate form a large target market or audience. The lack of technology available for low cost nationwide or worldwide audio communication is a significant shortcoming in the "Information Age". There is not at present an audio communications medium that can be broadcasts nationwide or worldwide to reach target markets and audiences with special interests, especially, when the market or audience is thinly spread and not concentrated in one or a few locales.

SUMMARY OF THE INVENTION

This summary of invention section is intended to introduce the reader to aspects of the invention and is not a complete description of the invention. Particular aspects of the invention are pointed out in other sections hereinbelow, and the invention is set forth in the appended claims which alone demarcate its scope.

The invention provides a system and apparatus that enables communication of audio information to audiences using the Internet. The audience may be thinly scattered over a large area, such as the United States, or even worldwide, and thereby allows access to the audience that a single radio station would not be able to achieve without use of the invention. The invention enables dissemination of information to an audience that selects to receive the information thereby allowing access to a target market or potential target market that otherwise may not have been reached.

In accordance with the system of the invention, audio information, in the form of a digital communication, is received at a remote receiver via the Internet. The digital information may include any information that is typically broadcast by radio, such as music and other radio programming. The system converts the digital information to analog information, and broadcasts the analog information in a localized area in at least one preselected radio frequency. The broadcast analog information is received and audio information is communicated to the listener. The receiver is preferably a common frequency modulated (FM) radio, capable of receiving the standard FM frequencies (in the range of about 88 MHz to about 108 MHz), tuned to the preselected frequency broadcast in the localized area, but could equally well be an amplitude modulated (AM) radio (in the range of about 540 kHz to about 1.6 MHz), or other type of radio. Thus, the user selects the audio communication (or digital information equivalent) it requires through the Internet, and the information is broadcast to the user's radio in a localized area (such as the user's home) where the user can hear the selected audio communication.

The invention also provides an Internet receiver/transmitter apparatus for receiving the digital information from the Internet, converting the information to analog form and transmitting to a radio receiver. The apparatus is preferably programmable for user preferences, for example, so that broadcasting may commence at a particular time at a particular frequency, and optionally cease at another time. Accordingly, the commencement of the broadcast may serve as an "alarm clock". In one embodiment, the apparatus is programmable through a PC with which it is in communication although programming may also be by other means, such as a keypad and internal software. Further, the apparatus is not limited to broadcasting only a single radio program, but may broadcast multiple programs, with each program broadcast at a unique preselected (i.e. preprogrammed) frequency. Thus, several listeners in the immediate environment, such as a home, may tune their respective radios to a preselected frequency to receive radio programming of their choice. The invention is clearly useful in hotels, dormitories, hostels, and the like where many persons having differing preferences in programming content reside in close quarters where low powered transmission may reach them. The apparatus further may be supplied with a memory for storing received transmissions for broadcast at a preset later time, or on demand.

The apparatus preferably but not necessarily includes a user readable display and a user interface for inputting control parameters, such as time to commence broadcast, frequency of broadcast, and other useful information. A PC has a suitable user interface for the functions, for example, although use of a PC is not necessary for the invention.

The invention provides, for the first time, a system and apparatus that communicates audio information worldwide through the Internet and permits users in a localized area around the transmitter of the apparatus to select the particular radio programming content they wish to listen to and when.

BRIEF DESCRIPTION OF THE DRAWINGS

The following drawings are illustrative of embodiments of the invention and therefore do not limit the scope of the invention, but are presented to assist in providing a proper understanding of the invention. The drawings are not to scale, and are intended for use in conjunction with the explanations in the following detailed description section.

DETAILED DESCRIPTION OF THE PREFERRED EMBODIMENTS

This section describes aspects of the invention, and points out certain preferred embodiments of these aspects. This section is not intended to be exhaustive, but rather to inform and teach the person of skill in the art who will come to appreciate more fully other aspects, equivalents, and possibilities presented by the invention, and hence the scope of the invention as set forth in the claims which alone limit its scope.

In accordance with the invention, radio program content or other audio communications and music are transmitted as digital information through the Internet to an Internet receiver/transmitter in a home. The received digital information is converted to analog information and is broadcast in, for example, the frequency modulated (FM) radio frequency band at low power in a localized area for reception by ordinary FM radios. The system is capable of receiving multiple streams of different digital information, and broadcasting each of these on separate radio frequencies, so that each person in a household may hear its own selected programming on its own preselected radio frequency.

Figure 1:
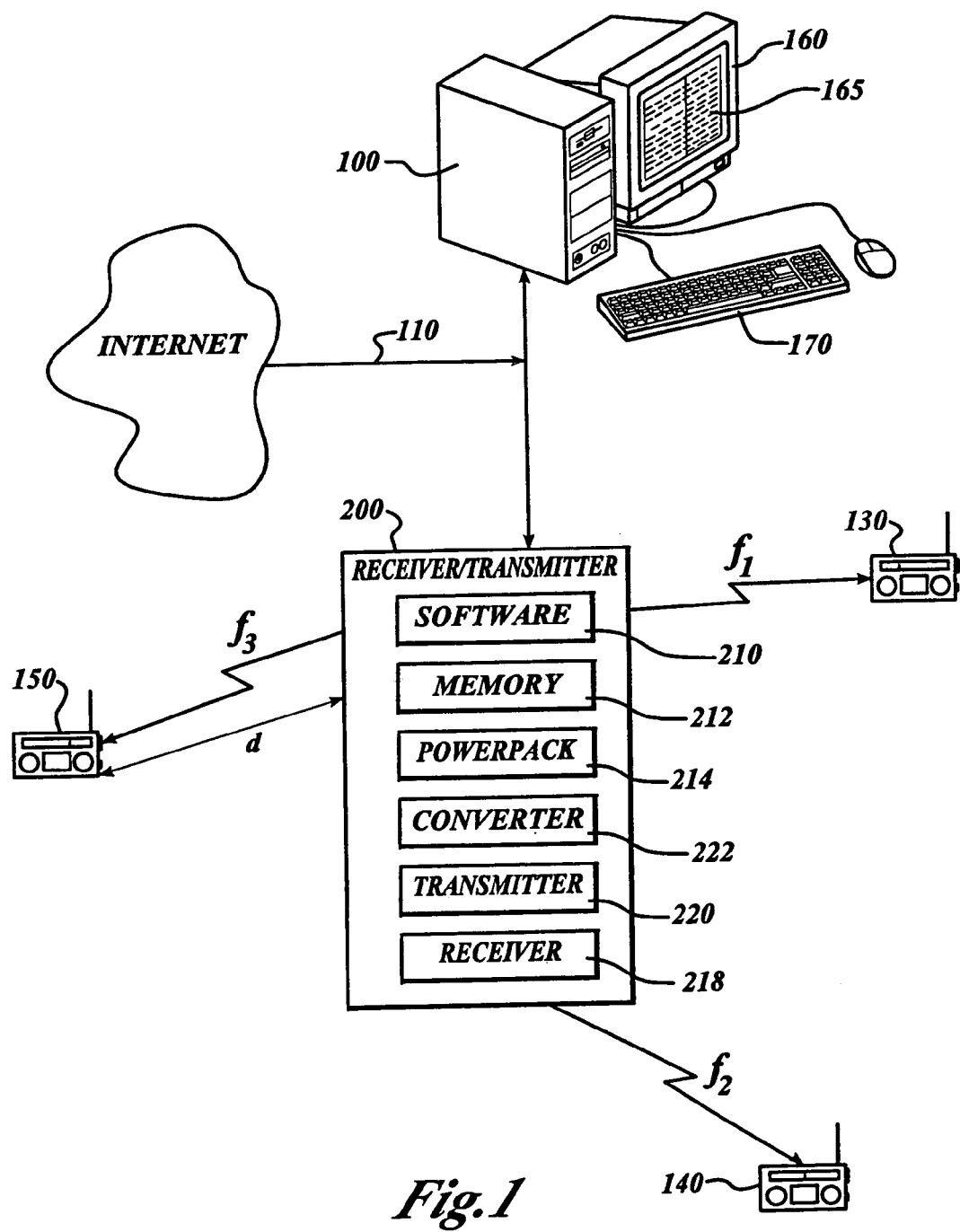
FIG. 1 is an illustrative schematic of a system in accordance with an embodiment of the invention where a PC interfaces with an Internet receiver/transmitter for programming the latter.
Figure 2:
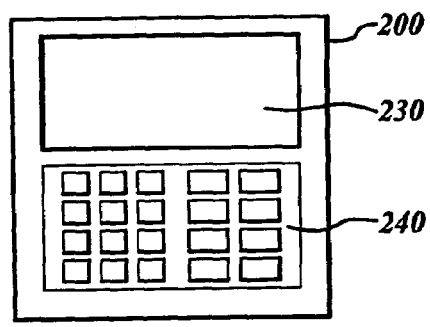
FIG. 2 is a front view of an embodiment of a home Internet radio transmitter in accordance with the invention.

The system and apparatus may be better understood with reference to the appended figures, that are provided for illustrative purposes only, and do not limit the scope of the invention. As shown in FIG. 1, radio programming and other audio communication is transmitted through the Internet to an Internet radio receiver/transmitter 200. The digital audio signal can be received from any one of several available means of transmission 110, for example, digital subscriber lines, cable, satellite transmission, and telephone lines. The digital information from which the audio signal is derived may be transmitted over line 110 in any convenient format and in accordance with a variety of known (or future) protocols. For example, the digital information might include audio content encoded in formats such as MP3, RealAudio, WAV, VOC and the like. The digital information received on Internet receiver 218 is converted to analog (222) on the converter 222. The receiver/transmitter 200, of which a preferred embodiment is shown in FIG. 2, preferably includes a user readable display 230, and a user input keypad 240. The keypad may be used to program the transmitter, by using software 210 stored in transmitter memory 212, but other embodiments may also be programmed, for example by interfacing with a PC.

Returning to FIG. 1, in the embodiment shown, the receiver/transmitter 200 may interface with a personal computer (PC) that provides an interface for programming the receiver/transmitter 200. Thus, a user may access the receiver/transmitter software 210, using PC 100, and input programming information through keyboard 170 for viewing on screen 165 of video display unit 160. The input parameters may then be stored in memory 212. Memory 212 preferably has capability to associate a selected input time with a selected radio frequency. Thus, for example, a user may input 7:30 a.m. as a time to commence transmission, and may select 95.6 as the FM radio frequency of transmission. The system is preferably also programmable to commence receiving digital information at a preselected time, and to broadcast or transmit the information at another selected time. For this purpose, the receiver/transmitter 200 has sufficient memory 212 for storing digital information received so that the information can be transmitted at the preprogrammed time and date. Thus, the invention, in its preferred embodiment, permits "time shifting", so that audio information can be received, stored, and played back at a preselected time, or upon demand.

In addition, transmitter 200 includes a low powered FM radio transmitter 220, that meets US Federal Communications Commission (FCC) or other applicable local guidelines for transmission of radio signals over a short distance d (i.e. "localized area"), without license requirement. Typically, "low powered" means less than about 100 milliwatts in the context of the Internet radio receiver/transmitter. Moreover, "localized area" refers to the zone within which a low powered transmission can be received on a radio for listening to the audio transmission. In this instance, transmitter 220 is shown as transmitting on three frequencies, $f_1$, $f_2$ and $f_3$ to each of three radios, 130, 140 and 150, respectively. Clearly, more or fewer transmission frequencies can be utilized, to allow more listeners to use the system and to select individualized programming. The receiver/transmitter 200 is either powered by electricity supply, or by a power pack 214, such as conventional dry cells or other "batteries."

In one embodiment of the invention, the receiver/transmitter device includes a PCI card. This card performs the functions of receiving and converting the incoming digital information to analog signals, and transmitting the analog signals to radio receivers in the localized area at low power in the FM or AM radio frequency range. Preferably, but not necessarily, in the invention, the PCI card is controlled (i.e. programmable) by the personal computer. A user inputs control information, such as time and radio frequency of transmission, using keypad 170. Preferably, the information is displayed on screen 165 of the video display unit 160 in user readable form.

For purposes of the specification and claims, a "personal computer" refers to any digital signal processor in communication with the Internet and able to receive information that can be audio broadcast to listeners using the system of the invention. Such "computers" include computers known in the industry generally as "PC's", products of Apple Computer and clones of these, laptop computers, hand-held computers, and palm-size computers, without limitation.

Figure 3:
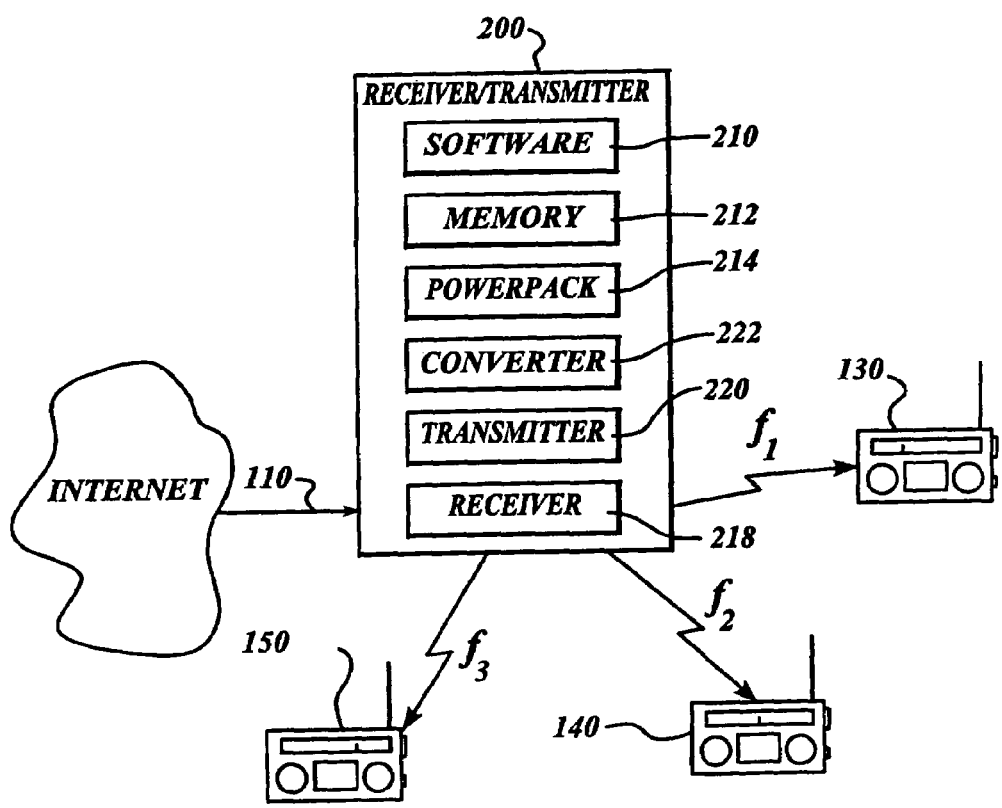
FIG. 3 is an alternative embodiment of a system in accordance with the invention, wherein the Internet radio receiver/transmitter is in communication with the Internet without interfacing with a PC.

The system of FIG. 3 does not require the use of another device to program the receiver/transmitter 200. Instead, a receiver/transmitter 200 is connected to the Internet through a signal carrier 110, receives the information through receiver 218, converts the information from digital to analog using converter 222, and transmits the information to radio receivers through FM transmitter 220. In a preferred embodiment, the receiver/transmitter 200 includes a user readable display 230, and a keypad 240 for programming, as shown in FIG. 2. Further, the receiver/transmitter may include an independent power pack 214, to supply power. The system preferably includes software for programming functions of the receiver/transmitter, such as when to commence receiving digital information, and when to transmit the information.

The receiver/transmitters of the invention may optionally include a memory for storing information received but to be transmitted a predetermined time and date, or later on demand. Thus, the invention permits "time shifting", so that audio information can be received, stored, and played back at a preprogrammed time, or upon demand.

The foregoing description provides an enabling disclosure of the invention, which is not limited by the description, but only by the scope of the appended claims. All those other aspects of the invention, and the equivalents, that will become apparent when a person of skill in the art has read the foregoing, are within the scope of the invention and of the claims hereinbelow.

The invention claimed is:

1. A method for receiving digital information and transmitting the information in a localized area, comprising the steps of:
   receiving audio communications from a plurality of streams of digital information from at least one remote source via the Internet;
   converting the digital information from the plurality of streams to respective analog information associated with each respective stream;
   broadcasting concurrently the respective analog information associated with multiple streams from the plurality of streams of digital information at low power in a localized area in multiple preselected radio frequencies chosen by at least one user; and
   receiving the broadcast information associated with the multiple streams in the localized area on multiple radio frequency receivers, each receiver tuned to one of the preselected frequencies to permit listening to one of the audio communications associated with one of the multiple streams, wherein the broadcasting concurrently of the respective analog information associated with multiple streams is initiated at a predetermined time chosen by the at least one user and in at least one of the preselected frequencies chosen by the at least one user, the at least one user tuning one of the radio frequency receivers to one of the preselected radio frequencies.

2. The method of claim 1, wherein the step of receiving audio communications from a plurality of streams of digital information comprises receiving information through a means selected from the group consisting of digital subscriber line transmission, telephone line transmission, cable transmission, and satellite transmission.

3. The method of claim 1, wherein the step of broadcasting comprises broadcasting in a radio frequency modulated waveband in the range of about 88 MHZ to about 108 MHZ and an amplitude modulated waveband in the range of from about 540 Khz to about 1.6 MHZ.

4. The method of claim 1, wherein the step of broadcasting the analog information comprises broadcasting at a power level less than about 100 milliwatts.

5. The method of claim 1, wherein the step of receiving digital information comprises receiving music as digital information.

6. The method of claim 1, wherein the step of receiving digital information comprises receiving radio program content as digital information.

7. An apparatus for receiving information and broadcasting the information in a localized area, the apparatus comprising:
   means for receiving a plurality of streams of digital information from at least one remote source via the Internet;
   means for converting the plurality of streams of digital information to respective analog information associated with each respective stream; and
   means for broadcasting concurrently the respective analog information of multiple streams of the plurality of streams of digital information in a localized area in multiple preselected radio frequencies chosen by at least one user; and
   means for programming the means for broadcasting, the means for programming comprising a program for setting a time to activate the means for broadcasting, wherein the at least one user tunes a radio frequency receiver to one of the preselected radio frequencies.

8. The apparatus of claim 7, further comprising means for displaying user readable information.

9. The apparatus of claim 7, wherein at least the means for receiving and means for converting are contained on a PCI card, the card receiving transmissions from the Internet and converting the transmissions to analog information for broadcasting.

10. The apparatus of claim 7, wherein the means for receiving, means for converting, and means for broadcasting are contained on a PCI card.

11. The apparatus of claim 7 further comprises means for storing received digital information for broadcasting at a later time.

12. A method for receiving digital information and transmitting the information in a localized area, the method comprising the steps of:
   receiving a plurality of streams of digital information from at least one remote source via the Internet;
   converting the plurality of streams of digital information to respective analog information associated with each respective stream;
   broadcasting concurrently the respective analog information associated with multiple streams of the plurality of streams of digital information in a localized area in multiple preselected radio frequencies chosen by at least one user, wherein at least one of the preselected radio frequencies is a frequency modulated radio frequency; and
   setting a time to activate the broadcasting step, wherein the at least one user tunes a radio frequency receiver to one of the preselected radio frequencies.

13. A method of claim 12, further comprising the step of storing at least one of the plurality of streams of received digital information before converting the digital information to the analog information associated with the at least one of the plurality of streams of received digital information.

14. A method of claim 13, wherein the at least one stored stream of digital information is converted to analog information associated with at least one stored stream at a predetermined time.

15. The method of claim 12, wherein at least one of the multiple preselected radio frequencies is a preselected amplitude modulated radio frequency.

16. The method of claim 1, wherein the at least one user tunes a first radio frequency receiver to one preselected radio frequency and a second radio frequency receiver to a different preselected radio frequency.

17. The apparatus of claim 7, wherein the program prompts the at least one user to specify the time to activate the means for broadcasting.

* * * * *